Patented July 23, 1929.

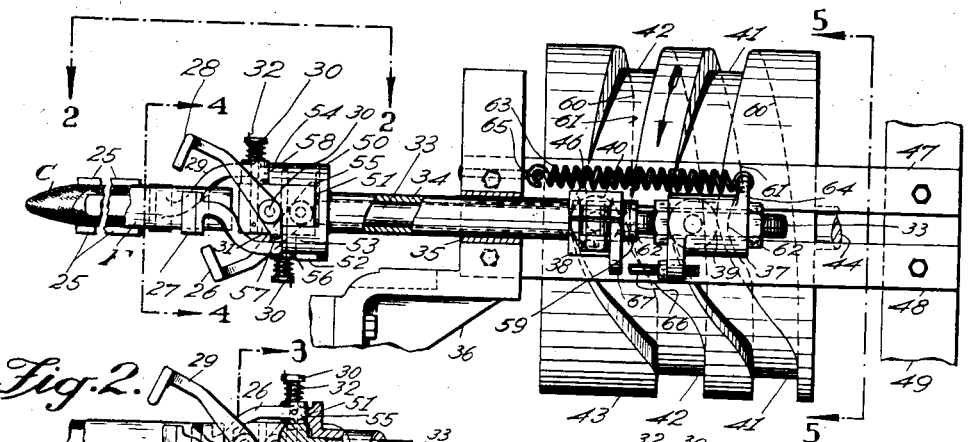

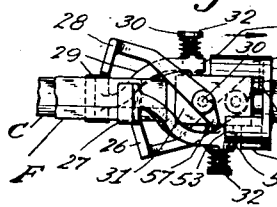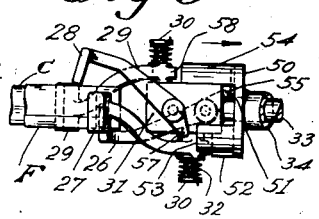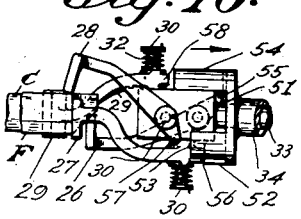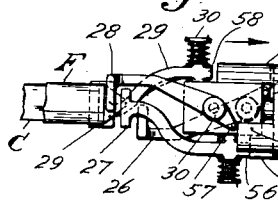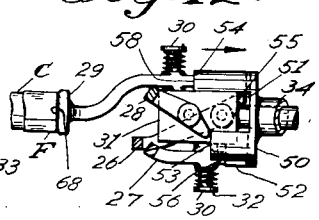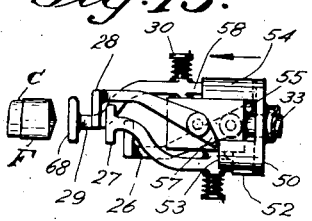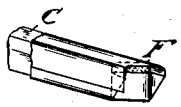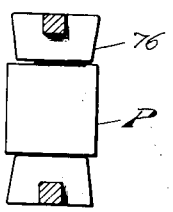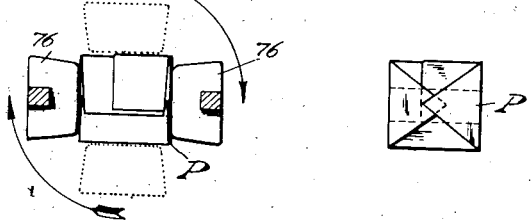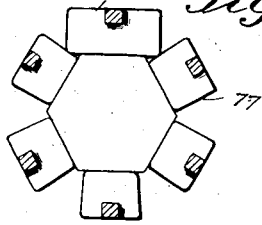

1,721,527

UNITED STATES PATENT OFFICE.

JOSEPH A. NEUMAIR, OF ST. ALBANS, AND HENRY H. WHEELER, OF BROOKLYN, NEW YORK, ASSIGNORS TO INTERNATIONAL CIGAR MACHINERY COMPANY, A CORPORATION OF NEW JERSEY.

PACKAGE-END-FOLDING DEVICE.

Application filed May 22, 1928. Serial No. 279,760.

This invention relates to package end folding devices, its object being to neatly fold the overhanging flaps of a wrapper over the ends of a stick shaped article, such as a cigar, a stick of candy, and the like. Other objects are to produce a simple and efficient device for this purpose which is adapted to operate on stick shaped articles varying considerably in shape, and which is capable of folding the ends of wrappers on such articles smoothly and without damage to delicate wrappers. Another object is to provide such a device which will smooth and fold the wrapper end over the stick in a manner approximating the action of an operator's hand performing the same function. With these and other objects not specifically mentioned in view, the invention consists of certain constructions and combinations which will be hereinafter fully described and then specifically set forth in the claims hereunto appended.

Generally speaking, the improved device consists of a number of successively spaced spring-pressed fingers, as many as there are sides to the package, which are placed one on each side of the package near the end to be folded and are then drawn over and away from the package so that each finger, as it closes inwardly when passing the end of the article being wrapped, folds one of the overhanging flaps over the end of the article, laying it atop of the flap folded over by the preceding finger. The folding fingers are swingably mounted on a block which is provided with actuating means for imparting to it an axial reciprocating motion, thus producing relative approaching and retreating movement between the package support. Each finger has a rear end projection or tail with which engages a corresponding prong attached to a head which is also provided with means for axially reciprocating the head. The finger-block reciprocating means and the prong head reciprocating means are so related that, for a portion of their travel, there is a relative motion between the fingers and the prongs while, for the remainder of their travel, they move as one.

In operation, while the fingers are approaching the package, relative forward motion of the prong head places the prongs in engagement with the fingers, thereby opening the fingers and holding them open until they have arrived in operating position over the package. Upon then being drawn back, relative backward motion of the prong head withdraws the prongs, thereby disengaging the fingers and permitting them to close against the sides of the package by suitable tension means. The backward motion is continued until all fingers have closed over the end of the package and until the finger last acting on the package has passed a small distance beyond the package, whereupon the motion is again reversed, this time without opening the fingers, and the tip of the last finger, which is now nearest the package, is made to press against the newly folded end of the same, thereby laying the end flaps down smoothly and, in case of a foil-wrapper, sealing the same.

In the accompanying drawings, in which the application of the improved end folding device to the folding of a foil cigar wrapper at the blunt end of a cigar is shown:

Fig. 1 is a side elevation of the end folding device, with the folding fingers in their operating position ready to close down upon the cigar wrapper;

Fig. 2 is a plan view, partly in section, of the portion of the device embraced by line 2—2 of Fig. 1;

Fig. 3 is an end elevation, partly in section, on line 3—3 of Fig. 2, showing the tripping mechanism of the folding fingers;

Fig. 4 is an end elevation of a section of the device taken on line 4—4 of Fig. 1, showing the arrangement of the fingers;

Fig. 5 is an end elevation of a section of the device taken on line 5—5 of Fig. 1, showing details of the finger block moving mechanism;

Fig. 6 is a plan view showing a modification of the device;

Fig. 7 is a side elevation of the modified folder, taken on line 7—7 of Fig. 6;

Figs. 8 to 13 are side elevations of the finger carrying portion of the device shown in Fig. 1, showing the successive stages of the folding operation;

Fig. 8 shows the fingers after having closed down upon the wrapper;

Fig. 9 shows the folder moved to its first end position when the first or bottom finger springs inwardly and folds the bottom end flap;

Fig. 10 shows the operation of the second or front finger in folding the front end flap;

Fig. 11 shows the operation of the third or top finger in folding the top flap;

Fig. 12 shows the operation of the last or rear finger in folding the rear flap;

Fig. 13 shows the device with all four fingers sprung inwardly and moved some distance beyond the end of the cigar;

Figs. 14 to 17 are perspective views showing the successive stages in the folding of the cigar wrapper corresponding to the operations of the fingers shown in Figs. 9 to 12, respectively;

Figs. 18 to 20 are end elevations showing diagramatically the end folding of a square package by means of a modified folder having two fingers only; and Figs. 21 and 22 are end elevations showing diagramatically the end folding of a hexagon shaped package by means of a modified folder having 6 fingers.

In carrying the invention into effect, there is provided means for supporting an article encircled by a wrapper which overhangs one of its ends, a plurality of fingers arranged in a group about a common axis intersecting the article, means for producing relative approaching and retreating movements of said fingers and said supporting means to move said fingers in and out of operative position, and means are provided for operating said fingers to cause them to open and pass over the end of the article during the approaching movement, and to successively close and fold portions of the overhanging wrapper on the end of the article during the retreating movement. In the best constructions, these movements are produced by moving the group of fingers toward and away from the supporting means. In the best constructions also, each of these fingers are spring-pressed toward said axis and cam actuated in the opposite direction. In the best constructions also, the wrapper fingers are carried by a block and project different distances beyond said block and means are provided for moving said block and fingers in and out of operative position, means being provided for operating said fingers while moving. The means above referred to may be widely varied in construction within the scope of the claims, for the particular machine selected to illustrate the invention is but one of many possible embodiments of the same. The invention, therefore, is not to be restricted to the precise structure shown and described.

Referring to Figs. 1 to 5, C is a cigar and F its foil wrapper, which for purposes of illustration is shown supported at the folding station of a well-known type of cigar foiling machine provided with jaws 25 in which the cigars are held, on an intermittently revolving turret, not shown. The foil folder is shown in position on the blunt end of the cigar C, the folding fingers ready to close down over the four sides of the wrapper F. The fingers 26, 27, 28 and 29, which are arranged so that their tip faces are successively spaced in staggered relation along the cigar, are swingably mounted on the studs 30 carried at right angles to each other and also in staggered relation by the square block 31. Coil springs 32, attached between the heads of the studs 30 and the fingers, give to the tips of the latter an inward pressure towards the article being wrapped.

It is noted that the tips of all fingers, except the last to operate which overlaps the package on both sides, are so placed with respect to the corners of the package that at their innermost position they will clear and not damage the yet unfolded flaps when closing down over the end of the package.

The block 31 forms one end of a reciprocating rod 33 slidably mounted within the hollow shaft 34, which is itself slidable in the bearing 35 of bracket 36. The inner end of rod 33 which protrudes from the inner end of the hollow shaft 34, is threaded and carries a collar 37, while on the inner end of the sleeve shaft 34 is mounted a collar 38. The collars 37 and 38 carry cam rollers 39 and 40, each in engagement with a separate cam track, 41 and 42 respectively, of cam 43 on shaft 44, which is preferably driven from the foiling machine supporting the cigar. The collars 37 and 38 have grooved lateral extensions 45 and 46, by which they are slidably mounted on parallel bars 47 and 48 carried by the brackets 36 and 49 of the foiling machine.

The hollow shaft 34, at the folder end, terminates in a head 50 which has four equally spaced prongs 51, 52, 53 and 54, progressively varying in length so that each in the forward position of the sleeve shaft 34 shown in Fig. 1, engages with one of the tail projections 55, 56, 57 and 58 on each of the fingers 26, 27, 28 and 29 and holds them open against the action of springs 32. Upon turning the cam 43, the prongs are withdrawn from their engagement with the tail projections and the fingers are pressed by springs 32 against the wrapper F. This action results from the movement of the cam roller 40 on the collar 38 towards the roller 39 on the collar 37 by rolling down on the trailing side of a hump 59 of the cam track 42, the roller 40 again running parallel with the roller 39 in cam track 41 after the hump 59 has passed from under the same.

The fingers, which are now resting on the foil wrapper F of the cigar C (Fig. 8), are drawn along the same by the action of cam 43, causing retreating movement of the finger block away from the cigar until they arrive at the end of the cigar C, when each finger in succession is sprung inwardly by its coil spring 32, their tips thereby folding down the respective end flaps, the collars 37 and 38 being so adjusted that the rear end projections of the fingers are arrested by hitting the respective prongs of the head 50 when the tip faces of the fingers are parallel with the end face of the cigar C. In Fig. 9, the first finger at the bottom of the wrapper having just passed the end of the cigar, is folding the bottom end flap with its tail 55 held in position by the prong 51. In Fig. 10, the second finger in front of the wrapper, is folding the front flap, its rear projection 56 being arrested by the prong 52. In Fig. 11, the third finger on top of the wrapper folds the top flap, while its projection 57 is arrested by prong 53. In Fig. 12, the last finger in the rear of the wrapper is folding the rear flap, its projection 58 having been stopped by the prong 54.

From the bottom of the hump 59, past a point 60 on the cam tracks at which the last finger 29 has been tripped, up to a point 61 at which rollers 39 and 40 are in the outermost position of their travel, the inner or roller actuating faces of tracks 41 and 42 are parallel and advance spirally so that the fingers controlled by roller 39, after having been withdrawn from the wrapper F, move some distance beyond the end of the cigar C, with their faces held in parallel position by the prongs controlled by roller 40. At points 61, the tracks have a depression 62 into which the roller 39 is pulled by a spring 63 stretched between a lug 64 of collar 37 and a hook 65 attached to the bracket 36, thereby forcing block 31 back against the end of the cigar and causing the flat forward face 68 of finger 29 to tap the newly folded end flaps, thus laying them down smoothly over the blunt end of the cigar. Upon roller 39 entering the depression 62, an adjustable stop screw 66 on collar 37 bears against a lug 67 of collar 38, thereby moving sleeve shaft 34 along with rod 33 and in such longitudinal relation as to hold the front face 68 (Fig. 13) in its inner parallel position while tapping the blunt end of the cigar, the screw 66 being adjusted to give the collars 37 and 38 the correct distance for this purpose. Between point 60 and the end of depression 62, the width of cam track 42 is made larger than the diameter of roller 40 so that the latter, which is held towards the side of cam track 42 nearest to track 41 by the pressure of the coil spring 63, can float transversely in the track and thereby accommodate the mechanism to variations in the lengths or positions of the cigars foiled. Beyond the depression 62, the cam tracks diverge, causing the rollers to move apart and head 50 and block 31 to come together, thereby opening the fingers preparatory to their being brought into position over the next cigar to be foiled.

In case of a delicate wrapping material, when it is desired to keep the folding fingers from touching the wrapper while being withdrawn from the end of the package, each finger may be provided with a locking device which holds it open while over the package and trips it automatically as it passes the end of the article wrapped.

In Figs. 6 and 7, a cigar foil folding device is shown in which the rear finger 29 is provided with such a locking arrangement, so that the rear surface of the foil wrapper which is to be placed uppermost in each layer when boxing the cigar will be free from "finger" marks. A bell crank lever consisting of arms 69 and 70, is pivoted on stud 71 of block 31 in such a manner that when the arm 69 is pulled against a stop pin 72 in the block 31 by a spring 73, the other arm 70 engages a stop pin 74 in the tail projection 58 of finger 29, so as to hold it open after the prong 54 has been withdrawn by the rearward motion of the folder. The finger then remains open until the arm 69 of the bell crank lever hits the end of a stationary bar 75, which is adjustably mounted on bracket 36 and is so set that its engagement with the arm 69 takes place at the moment the tip of finger 29 has reached the end of the cigar C. At this moment, the said engagement causes the bell crank lever to trip, thereby unlocking the pin 74 and tripping the folding finger 29 which thus folds the last end flap without having touched the side of the wrapper. Arm 69 then slides under bar 75 and thus remains in the tripped position until the finger 29, on its next forward movement, is passing the end of the cigar. At that time, the finger 29 is being held open by the prong 54, so that upon the emergence of arm 69 from bar 75, the spring 73 pulls arm 70 into locking position behind pin 74 of the already open arm 29, both the prong and the lock lever remaining in engagement until the tip of finger 29 has reached its innermost position on the cigar, when the prong is withdrawn and the lock lever then holds open the finger during its passage along the cigar.

As shown in Figs. 18 to 20, a square or other polygonal package having an even number of sides, can also be folded in this manner by but a single pair of staggered fingers operating successively on pairs of opposite sides by either turning the fingers or the package in successive steps through the proper angle, 90 degrees for a square package, 60 degrees for a hexagonal package, etc., very much as a human hand would perform the folding operation by drawing the thumb and forefinger, one slightly in advance of the other, over one pair of opposite sides after the other and closing the grip over the end of the package at each operation. Similarly, an even sided polygonal package may be end folded by a folder having one-half as many staggered fingers as the package has sides, by operating the folder successively in two relative positions differing by 180 degrees. Fingers 76 which are attached to opposite sides of a square folding block similar to block 31 of Figs. 1 to 13, are first drawn over two opposite sides of the package P, as in Fig. 18, thereby folding its top and bottom flap. Then, either the package or the fingers are turned through a right angle, as in Fig. 19, and the fingers are again applied as before, whereby the end flaps of the two sides of the package are folded down, Fig. 20 showing the finished fold of the end after the second application.

In Figs. 21 and 22, the application of the improved folding means to a hexagonal package is shown. In Fig. 21, a six fingered end folder is in position for folding the end flaps. The fingers 77 in this case are carried one on each side of a hexagonal block so that when applied to the package, each side has its own folding finger and all end flaps can be rapidly laid over into the neat form seen in Fig. 22 in one single operation.

What is claimed is:

1. The combination with means for supporting an article encircled by a wrapper which overhangs one of its ends, of a plurality of fingers arranged in a group about a common axis intersecting the article, means for producing relative axial approaching and retreating movements of said fingers and said supporting means to move said fingers in and out of operative position, and means for operating said fingers to cause them to open and pass over the end of the article during the approaching movement and to successively close and fold portions of the overhanging wrapper on the end of the article during the retreating movement.

2. The combination with means for supporting an article encircled by a wrapper which overhangs one of its ends, of a plurality of fingers arranged in a group about a common axis intersecting the article, means for producing relative axial approaching and retreating movements of said fingers and said supporting means to move said fingers in and out of operative position, and means for operating said fingers to cause them to open and pass over the end of the article during the approaching movement and to successively close and fold portions of the overhanging wrapper on the end of the article during the retreating movement, said movements being produced by moving the group of fingers toward and away from the supporting means.

3. The combination with means for supporting an article encircled by a wrapper which overhangs one of its ends, of a plurality of fingers arranged in a group about a common axis intersecting the article, means for producing relative axial approaching and retreating movements of said fingers and said supporting means to move said fingers in and out of operative position, and means for operating said fingers to cause them to open and pass over the end of the article during the approaching movement and to successively close and fold portions of the overhanging wrapper on the end of the article during the retreating movement, each of said fingers being spring-pressed towards said axis and cam-actuated in the opposite direction.

4. The combination with means for supporting an article encircled by a wrapper which overhangs one of its ends, of a plurality of fingers arranged in a group about a common axis intersecting the article, means for producing relative axial approaching and retreating movements of said fingers and said supporting means to move said fingers in and out of operative position, and means for operating said fingers to cause them to open and pass over the end of the article during the approaching movement and to successively close and fold portions of the overhanging wrapper on the end of the article during the retreating movement, said movement producing means and said finger operating means being cam-controlled.

5. The combination with a block, of a group of wrapper-folding fingers carried by and projecting different distances beyond said block, means for moving said block and fingers in and out of operative position, and means for operating said fingers while moving.

6. The combination with a block, of a group of wrapper-folding fingers carried by and projecting different distances beyond said block, means for moving said block and fingers in and out of operative position, and means for operating said fingers while moving, said moving means being cam-actuated.

7. The combination with a block, of a group of wrapper-folding fingers carried by and projecting different distances beyond said block, means for moving said block and fingers in and out of operative position, and means for operating said fingers while moving, said moving means including a reciprocating rod carrying said block.

8. The combination with a block, of a group of wrapper-folding fingers carried by and projecting different distances beyond said block, means for moving said block and fingers in and out of operative position, and means for operating said fingers while moving, said operating means being spring actuated and cam-controlled.

9. The combination with a block, of a group of wrapper-folding fingers carried by and projecting different distances beyond said block, means for moving said block and fingers in and out of operative position, and means for operating said fingers while moving, said operating means including a reciprocating member having a series of prongs each of which engages one of the fingers.

10. The combination with a block, of a group of wrapper-folding fingers carried by and projecting different distances beyond said block, means for moving said block and fingers in and out of operative position, and means for operating said fingers while moving, said moving means including a reciprocating rod carrying said block, and said operating means including a sleeve carried by said rod and having a series of prongs each of which engages one of the fingers.

11. The combination with a block, of a group of wrapper-folding fingers carried by and projecting different distances beyond said block, means for moving said block and fingers in and out of operative position, and means for operating said fingers while moving, said fingers being mounted in staggered relationship on the sides of said block.

12. The combination with a block, of a group of wrapper-folding fingers carried by and projecting different distances beyond said block, means for moving said block and fingers in and out of operative position, and means for operating said fingers while moving, each of said fingers including a supporting stud secured to said block, and a spring normally pressing the finger toward the axis of the group.

13. The combination with a block, of a group of wrapper-folding fingers carried by and projecting different distances beyond said block, means for moving said block and fingers in and out of operative position, and means for operating said fingers while moving, each of said fingers having a tail engaged by said operating means.

14. The combination with a block, of a group of wrapper-folding fingers carried by and projecting different distances beyond said block, means for moving said block and fingers in and out of operative position, and means for operating said fingers while moving, each of said fingers having a substantially flat transverse wrapper folding tip.

15. The combination with a block, of a group of wrapper-folding fingers carried by and projecting different distances beyond said block, means for moving said block and fingers in and out of operative position, and means for operating said fingers while moving, said moving means and said operating means including a two-track cam, a slideway adjacent said cam, members reciprocating in said slideway for moving said block and for operating said fingers, and cam rollers carried by said members and engaging said tracks.

16. The combination with a block, of a group of wrapper-folding fingers carried by and projecting different distances beyond said block, means for moving said block and fingers in and out of operative position, and means for operating said fingers while moving, said moving means and said operating means including a two-track cam, a slideway adjacent said cam, a rod and concentric sleeve guided by said slideway for respectively moving said block and for operating said fingers, and cam rollers carried by said rod and said sleeve and engaging said tracks.

In testimony whereof, we have signed our names to this specification.

JOSEPH A. NEUMAIR.
HENRY H. WHEELER.